United States Patent
Singh et al.

(10) Patent No.: US 11,269,892 B2
(45) Date of Patent: Mar. 8, 2022

(54) RANKING IMAGES BASED ON IMAGE EFFECTS

(71) Applicant: ADOBE INC., San Jose, CA (US)

(72) Inventors: Ujjaval Kumar Singh, New Delhi (IN); Shubham Gupta, Uttar Pradesh (IN); Rahul Kesharwani, Uttar Pradesh (IN); Anmol Dhawan, Ghaziabad (IN)

(73) Assignee: ADOBE INC., San Jose, CA (US)

( * ) Notice: Subject to any disclaimer, the term of this patent is extended or adjusted under 35 U.S.C. 154(b) by 374 days.

(21) Appl. No.: 15/801,014

(22) Filed: Nov. 1, 2017

(65) Prior Publication Data
US 2019/0129962 A1 May 2, 2019

(51) Int. Cl.
*G06F 16/00* (2019.01)
*G06F 16/2457* (2019.01)
*G06F 16/54* (2019.01)
*G06F 16/583* (2019.01)
*G06F 16/538* (2019.01)
*G06F 16/53* (2019.01)

(52) U.S. Cl.
CPC ........ *G06F 16/24578* (2019.01); *G06F 16/53* (2019.01); *G06F 16/538* (2019.01); *G06F 16/54* (2019.01); *G06F 16/5838* (2019.01)

(58) Field of Classification Search
CPC . G06F 16/24578; G06F 16/5838; G06F 16/54
USPC ...................................................... 707/723
See application file for complete search history.

(56) References Cited

U.S. PATENT DOCUMENTS

| | | | | |
|---|---|---|---|---|
| 7,574,038 | B1* | 8/2009 | Cohen | G06T 7/215 382/163 |
| 8,368,762 | B1* | 2/2013 | Chen | H04N 17/002 348/188 |
| 8,374,457 | B1* | 2/2013 | Wang | G06T 5/002 382/266 |
| 8,379,047 | B1* | 2/2013 | DiVerdi | G06T 11/001 345/592 |
| 10,127,290 | B1* | 11/2018 | Armstrong | H04N 21/234381 |
| 10,565,518 | B2* | 2/2020 | Jin | G06N 20/00 |
| 2004/0008283 | A1* | 1/2004 | Yang | H04N 9/646 348/656 |
| 2014/0105505 | A1* | 4/2014 | Ioffe | G06F 16/583 382/197 |
| 2014/0270370 | A1* | 9/2014 | Saito | G06K 9/00288 382/103 |

(Continued)

*Primary Examiner* — Monica M Pyo
(74) *Attorney, Agent, or Firm* — Shook, Hardy & Bacon L.L.P.

(57) ABSTRACT

Approaches are described for ranking images against image effects. An image effect is identified from a plurality of image effects. Each image effect includes instructions defining steps of modifying visual data of an input image to produce an output image. Preview images are generated, where for each data object of a plurality of data objects the instructions of the image effect are applied to a respective image corresponding to the data object to generate a preview image of the data object. Ranking scores are determined, where for each data object visual data of the respective image is analyzed using a set of evaluation criteria associated with the image effect to determine a ranking score of the image effect for the data object. Data is transmitted which causes at least one of the preview images to be presented on a user device based on the ranking scores.

17 Claims, 8 Drawing Sheets

(56) References Cited

U.S. PATENT DOCUMENTS

| | | | |
|---|---|---|---|
| 2016/0158648 A1* | 6/2016 | Adamson | A63F 13/63 |
| | | | 463/31 |
| 2017/0052956 A1* | 2/2017 | Wise | G06F 16/24578 |
| 2018/0146160 A1* | 5/2018 | Kang | H04N 7/15 |
| 2018/0184140 A1* | 6/2018 | Danker | H04N 21/25891 |
| 2018/0191962 A1* | 7/2018 | Javier | G06F 3/0482 |

* cited by examiner

RANKING IMAGES BASED ON IMAGE EFFECTS

BACKGROUND

Media editing software, such as Adobe® Photoshop®, Adobe After Effects®, and Adobe Premiere® provide tools (e.g., cut, paste, select) users can select from to modify visual data of digital images and video. The tools can be combined to create an unlimited number of diverse image effects. Conventionally, substantial barriers exist that hinder a user's ability to implement image effects using media editing software. For example, media editing software often is incapable of informing users of potential image effects, leaving them to be discovered by viewing edited images in magazines and posters. When a user does become aware of a particular image effect, implementing the effect may require significant skill and knowledge of the tools and steps involved. Users who are not deterred may blindly experiment with the software, and others may seek tutorials, which may not be available for particular software and/or for a particular effect.

Were a user to overcome these hurdles, the result of applying an image effect to an image often will produce unacceptable results, regardless of the skill of the user. In particular, some images and/or videos are more suitable for a particular image effect than others, such that many result in low quality output. Conventional media editing software is incapable of indicating how suitable a particular image is for a particular image effect. Therefore, a user must arbitrarily choose an image and manually apply the image effect, then evaluate the quality of the end result. When the result is low quality, a user may discard the result and some may start over with a new image, resulting in wasted computer resources and a poor user experience. Compounding these issues, many users have a large volume of images to choose from for image effects. For example, users often have many images available from albums, camera rolls, and social network feeds.

SUMMARY

Aspects of the present disclosure provide computing systems with capabilities for ranking images based on image effects. In doing so, the systems can use the rankings to provide users with indications of the suitability of particular images for particular image effects. Thus, users are more likely to select images for image effects that will result in higher quality outputs.

A computer system stores a plurality of predefined image effects and sets of evaluation criteria used to quantify the suitability of particular image effects for particular images. A "set of evaluation criteria" for an image effect refers to a benchmark or standard measure that defines a degree to which a given image (or set of images, or video) is suitable for the image effect, such that different images can be directly compared as to their suitability for the image effect. Each image effect may have its own set of evaluation criteria. In some cases, one or more sets of evaluation criteria, and/or portions thereof can be shared for different image effects.

A user can select at least one image effect in a user interface to view a ranking of a set of images against the image effect. The user may then select one or more of the presented images to trigger a computer action, such as loading a selected image in media editing software for viewing and editing. The loaded image may comprise a version of the image in which the image effect has been applied. The user can modify parameters of the image effect to alter the application of the effect.

The system determines the ranking of images by analyzing the visual data of the images to determine image features. For each image effect, the image features are applied to the set evaluation criteria associated with the image effect to determine ranking scores of the images for the image effect. Using the ranking scores, the system can determine an order in which to present the images to indicate the relative suitability of the images for the selected image effect(s). The images presented for a particular image effect can comprise a preview image of the image effect for each image. The system may generate the preview image by applying the image effect to a lower resolution version of the original image to reduce processing requirements. Further, the system can determine at least one image feature used to determine a ranking score for an image by analyzing an output of a step of applying the image effect to the image to reduce processing requirements.

BRIEF DESCRIPTION OF THE DRAWINGS

The present invention is described in detail below with reference to the attached drawing figures, wherein.

DETAILED DESCRIPTION

Figure 1:
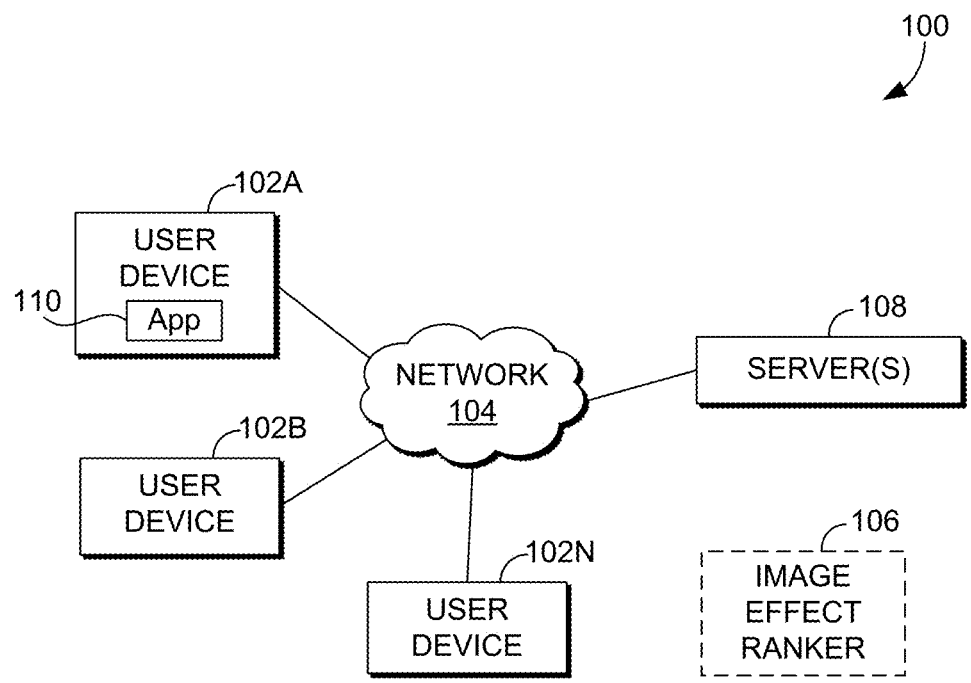
FIG. 1 is a block diagram showing an example of an operating environment, in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Conventional computing systems are incapable of indicating how suitable a particular image is for a particular image effect. Therefore, a user must arbitrarily choose an image and manually apply the image effect, then evaluate the quality of the end result. When the result is low quality, a user may discard the result and some may start over with a new image, resulting in wasted computer resources and a poor user experience. Compounding these issues, many users have a large volume of images to choose from for image effects. For example, users often have many images available from albums, camera rolls, and social network feeds.

The present application provides, in part, computing systems with capabilities for ranking images based on image effects. In doing so, the systems can use the rankings to provide users with indications of the suitability of particular images for particular image effects. Thus, users are more likely to select images that will result in higher quality outputs. This can reduce the number of low quality outputs produced using images effects, thereby preserving computing resources, and can improve user interactions with the systems.

While examples may be described in terms of particular images and image effects, it should be appreciated that discussion of a particular image also applies to one or more images, videos, and/or data objects containing that visual data when appropriate, and discussion of a particular image effect also applies to one or more image effects when appropriate. For example, the disclosure further provides for ranking the data objects and/or videos based on image effects, and presenting those items to users accordingly. It should therefore be appreciated that some image effects may be provided that are applied to videos to produce output videos and/or images to produce output images.

As used herein, an "image effect" refers to a predetermined set of computer instructions (e.g., a script) defining steps of modifying visual data of an input image to produce an output image. Each step may produce at least one intermediate output, such as at least one identified region (e.g., pixels) of an image which can include an identified object in the image and a background of the image. Another step may produce the output image using an output from a preview step, such as to determine which visual data of the image to alter and/or how to alter that visual data.

One example of an image effect is a dispersion effect in which visual data of an object (e.g., a person, an animal) in an image is scattered in a direction into the background of the image. The dispersion effect can include a step of identifying the object in the image, using the object to identify the background of the image, and using the identified object and background to move particles from the object to the background and to fill resultant gaps in the object with visual data that matches the background. Other examples of images effects are provided throughout.

In various implementations, a computer system stores a plurality of predefined image effects and sets of evaluation criteria used to quantify the suitability of particular image effects for particular images. A user can select at least one image effect in a user interface to view a ranking of a set of images against the image effect. The user may then select one or more of the presented images to trigger a computer action, such as loading a selected image in media editing software for viewing and editing. The loaded image may comprise a version of the image in which the image effect has been applied. The user can modify parameters of the image effect to alter the application of the effect.

The system determines the ranking of images by analyzing the visual data of the images to determine image features. For each image effect, the image features are applied to the set evaluation criteria associated with the image effect to determine ranking scores of the images for the image effect. Using the ranking scores, the system can determine an order in which to present the images to indicate the relative suitability of the images for the selected image effect(s). The images presented for a particular image effect can comprise a preview image of the image effect for each image. The system may generate the preview image by applying the image effect to a lower resolution version of the original image to reduce processing requirements. Further, the system can determine at least one image feature used to determine a ranking score for an image by analyzing an output of a step of applying the image effect to the image to reduce processing requirements.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102A and 102B through 102N, network 104, and server(s) 108.

It should be understood that operating environment 100 shown in FIG. 1 is an example of one suitable operating environment. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102A through 102N comprise any type of computing device capable of being operated by a user. For example, in some implementations, user devices 102A through 102N are the type of computing device described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out aspects of the present disclosure. In some implementations, the application(s) comprises a web application, which can run in a web browser, and could be hosted at least partially on the server-side of operating environment 100. In addition, or instead, the application(s) can comprise a dedicated application, such as media editing software, examples of which include Adobe Photoshop, Adobe After Effects, and Adobe Premiere. In some cases, one or more applications represented by application 110 is integrated into the operating system (e.g., as a service). It is therefore contemplated herein that "application" be interpreted broadly.

Server(s) 108 also includes one or more processors, and one or more computer-readable media. The computer-readable media includes computer-readable instructions executable by the one or more processors. The instructions may optionally implement one or more components of image effect ranker 106, described in additional detail below. However, the components may generally be implemented on any combination of server(s) 108, user devices 102A, and/or application(s) 110. Additionally, other components not shown may also be included within the distributed environment.

Thus, it should be appreciated that image effect ranker 106 may be provided via multiple devices arranged in a distributed environment that collectively provide the functionality described herein, or may be embodied on a single device. In some cases, image effect ranker 106 can be integrated, at least partially, into a user device, such as user device 102A. Furthermore, image effect ranker 106 may at least partially be embodied as a cloud computing service.

For cloud-based implementations, the instructions on server 108 may implement one or more components of image effect ranker 206, and application 110 may be utilized by a user to interface with the functionality implemented on server(s) 108. As mentioned above, in some cases, application 110 comprises a web browser. In other cases, server 108 may not be required. For example, the components of image effect ranker 206 may be implemented completely on a user device, such as user device 102A. In this case, image effect ranker 206 may be embodied at least partially by the instructions corresponding to application 110.

Image effect ranker 106 can determine ranking scores of one or more images, videos, and/or data objects for one or more image effects. Image effect ranker 106 can determine a ranking score of each image, which quantifies a level of suitability of the image for a particular image effect. While examples may be described in terms of particular images and image effects, it should be appreciated that discussion of a particular image also applies to one or more images, videos, and/or data objects when appropriate, and discussion of a particular image effect also applies to one or more image effects when appropriate. Thus, in the example above, image effect ranker 106 could determine a ranking score for a set of images, which quantifies a level of suitability of the set of images for a set of image effects.

In various implementations, image effect ranker 106 can use the ranking scores to rank images with respect to one or more image effects. For example, given a set of images, image effect ranker 106 can rank those images by suitability for a particular image effect, or for suitability for any one of a set of images effects (e.g., ranking scores for different image effects may be normalized or on a common scale for direct comparison).

The ranked images can be used to indicate to users the suitability of images for image effects. This can include using the ranking scores to present one or more images on a user device (e.g., user device 102A). For example, given a list of images, the ranking scores can be used to order the images by suitability of an image effect, and the images can be displayed in that order. A user may then select a presented image to cause one or more actions to be performed on the image, such as saving the image, opening the image in media editing software, loading the image into a messaging application, applying the image effect, and more.

In some implementations, image effect ranker 106 generates a preview image for each image for which a ranking score is determined by applying the image effect to an original version of the image or a scaled down version of the image. This preview image of an image may optionally be what is displayed when presenting the image on a user device based on its ranking score.

Figure 2:
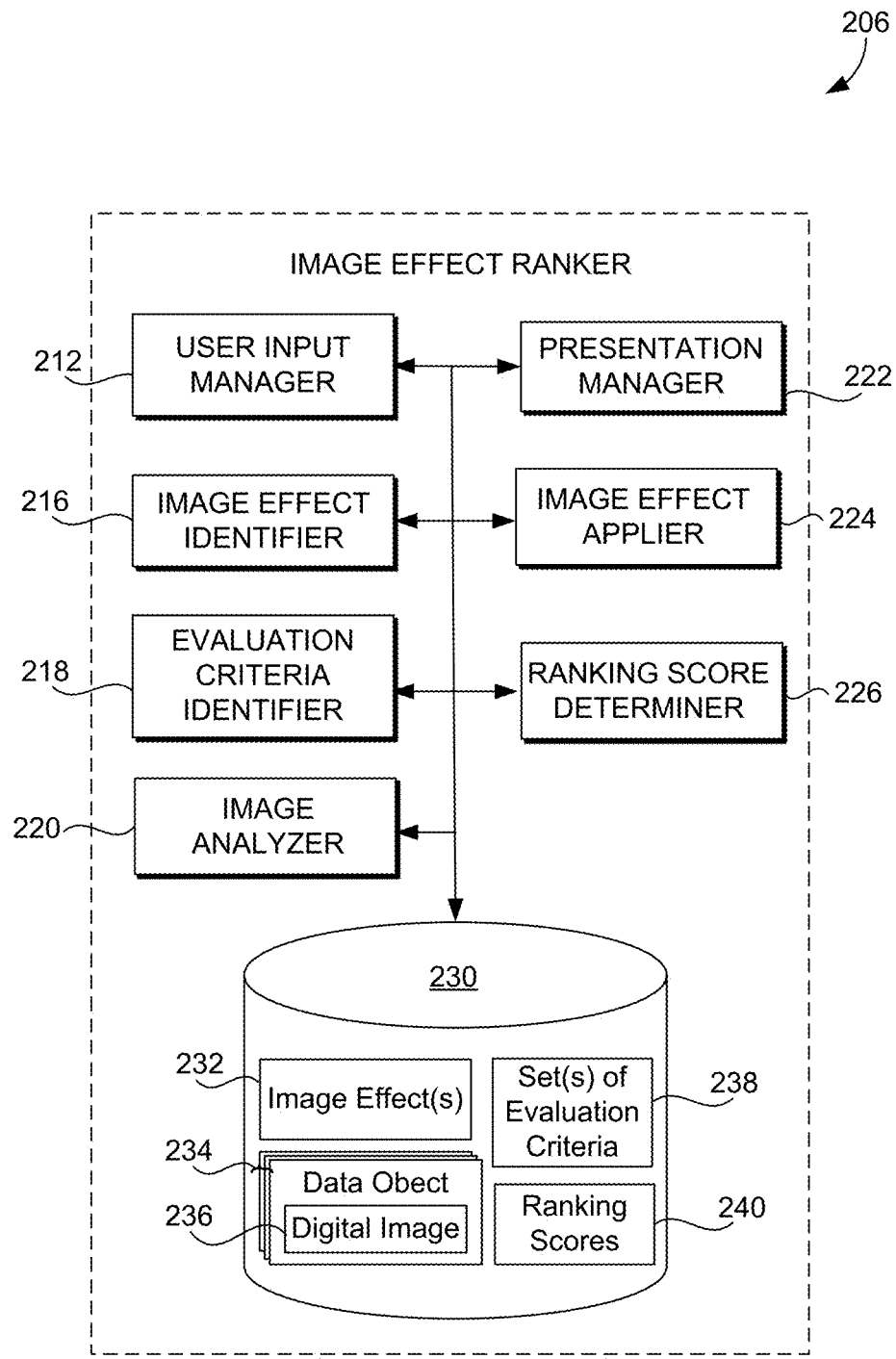
FIG. 2 shows a block diagram of an image effect ranker, in accordance with embodiments of the present disclosure.

Referring to FIG. 2, a block diagram of an image effect ranker is shown, in accordance with embodiments of the present disclosure. Image effect ranker 206, which can correspond to image effect ranker 106 of FIG. 1, includes user input manager 212, image effect identifier 216, evaluation criteria identifier 218, image analyzer 220, presentation manager 222, image effect applier 224, ranking score determiner 226, and storage 230.

Storage 230 can comprise computer-readable media and is configured to store computer instructions (e.g., software program instructions, routines, or services), data, and/or models used in embodiments described herein. In some implementations, storage 230 stores information or data received via and/or generated by the various components of image effect ranker 206 and provides the various components with access to that information or data, as needed. In implementations, storage 230 comprises a data store (or computer data storage). Although depicted as a single component, storage 230 may be embodied as one or more data stores and may be at least partially in the cloud. Some information, such as data objects, may be stored on a user device (e.g., user device 102A), and other information may be stored externally (e.g., on a server 108). Thus, it should be appreciated that the information in storage 230 may be distributed in any suitable manner across one or more data stores for storage (which may be hosted externally).

Among other potential information, storage 230 includes, as examples, one or more image effects 232, one or more data objects 234, one or more set of evaluation criteria 238, and one or more ranking scores 240. In the present example, each data object 234 comprises a digital image, such as digital image 236, but could include any number of images. Each data object 234 may be in an image file format (e.g., a bitmap and/or vector file format) or video file format, as examples.

As an overview, user input manager 212 is configured to receive user input from users via a user device, such as any of the user devices shown in FIG. 1. In some cases, the user input can represent a user selection of one or more images and/or image effects. Image effect identifier 216 is configured to identify one or more image effects of image effects 232 (e.g., based on the user input). Evaluation criteria identifier 218 is configured to identify one or more sets of evaluation criteria 238, for example, for each of the identified image effect(s). Image analyzer 220 is configured to analyze images to determine image features of the images (e.g., values), used to determine ranking scores for those images. Ranking score determiner 226 is configured to determine ranking scores for the images by applying the image features to the set of evaluation criteria. Image effect applier 224 is configured to apply image effects to images. Presentation manager 222 is configured to cause presentation of information on one or more user devices based on ranking scores.

As mentioned above, user input manager 212 is configured to receive user input from users via a user device, such as any of the user devices shown in FIG. 1. For example, the user input can be provided to application 110. In some cases, the user input can represent a user selection of one or more images and/or image effects. For example, the user selection(s) can be made in a graphical user interface (GUI) displayed on a user device. As an example, one or more images could be selected in the GUI. This could include selecting images individually, and/or as groups of images using a corresponding checkbox or other graphical control element. In some cases, the user could select an album or camera roll as a whole and/or select individual images therefrom. Similarly, image effects could be individually selectable via a corresponding checkbox or graphical control element.

In some implementations, image effect ranker 206 uses the user selections to determine which images and/or image effects to generate ranking scores for and/or which images to present to a user based on the ranking scores. For example, ranking score determiner 226 could determine ranking scores for the selected images for the selected image effects. In addition or instead, presentation manager 222 could cause presentation of the selected images (e.g., preview images) based on the ranking scores for the selected image effects. From the forgoing, it should be appreciated that in some cases, ranking scores of images and/or image effects are determined in advance of the user selections. By processing at least some of the images in advance of user selections to determine ranking scores, the system latency for presenting images based on ranking scores can be reduced.

Figure 3:
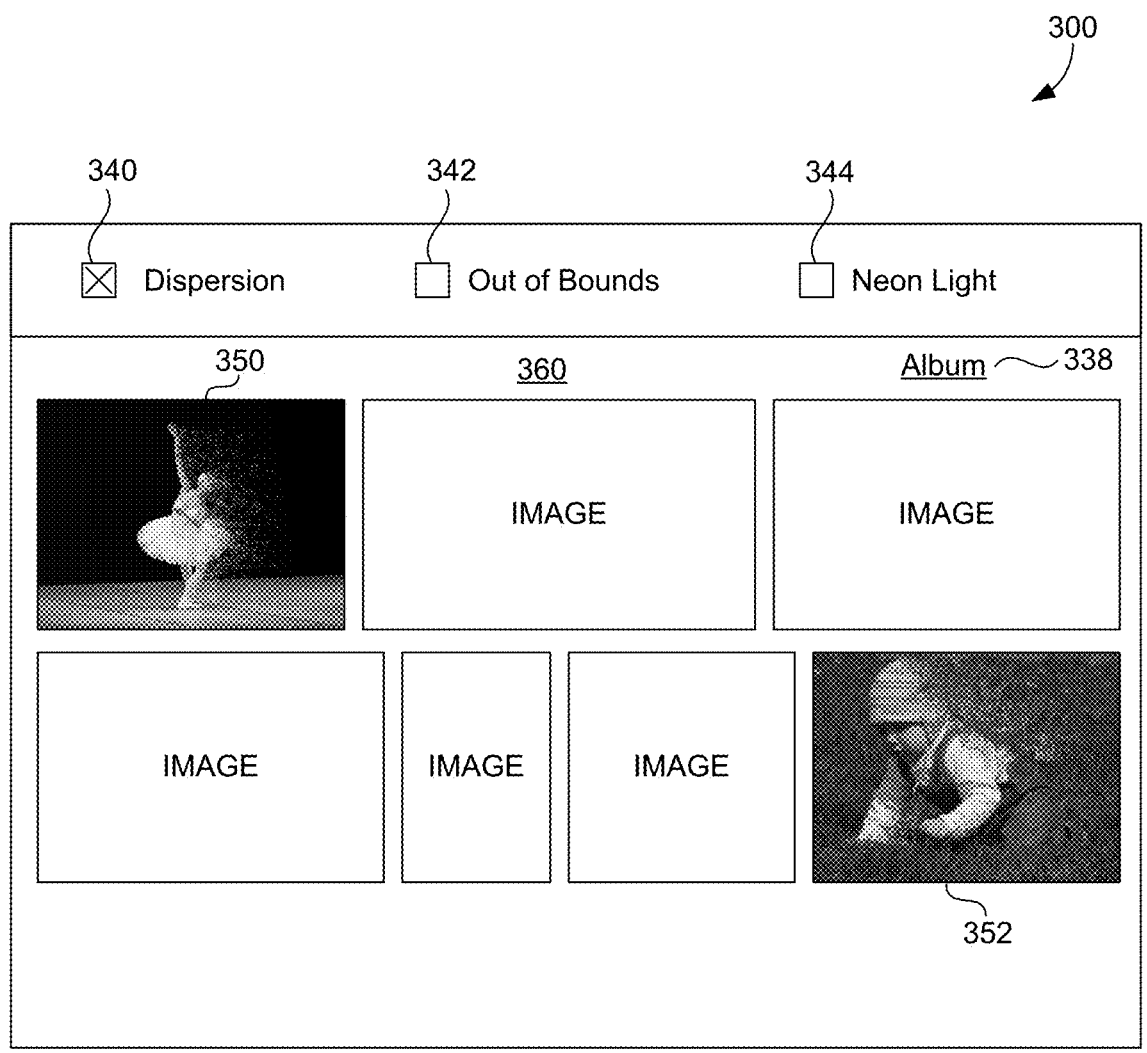
FIG. 3 shows a block diagram of a graphical user interface, in accordance with embodiments of the present disclosure.

Referring to FIG. 3, FIG. 3 shows an example of a graphical user interface, in accordance with embodiments of the present disclosure. In GUI 300 of FIG. 3, the user has selected a set of images, which are displayed on a user device in GUI 300. In this example, the selection of the set of images was made by selecting album 338, which includes those images. As shown, the set of images are displayed in gallery view 360. The user may selectively toggle between selections of one or more image effects in GUI 300. For example, when the user selects image effect 340, presentation manager 222 could determine an order to present the images in gallery view 360 based on ranking scores corresponding to the selected image effect, and update and/or initially display gallery view 360 to reflect that order. This order may correspond to what is shown in FIG. 3, with image 350 having the highest ranking score for image effect 340 (and therefore being listed first), and image 352 having the lowest ranking score for image effect 340 (and therefore being listed last).

Further, when images are presented based on ranking scores for image effects, the visual data that is displayed for a particular image need not be the original image, but could be a preview image of a newly selected image effect generated from that image, as in FIG. 3. This preview image may be generated by image effect applier 224. In some cases, image effect applier 224 applies the image effect to a lower resolution version of the image. This can reduce the processing power used to preview the image effects on the images.

In some cases, a particular image could be presented in multiple places, each corresponding to a different ranking score and corresponding image effect. For example, were the user to additionally select image effect 342 and image effect 344, three preview images could be presented for each image, one for each selected image effect. It should be appreciated that FIG. 3 is provided to illustrate a small set of examples of how image effect ranker 206 could operate.

As mentioned above, image effect identifier 216 is configured to identify one or more image effects of image effects 232. This identification could be based on the user selections and/or user input from user input manager 212. For example, based on a user selecting image effect 340 in FIG. 3, image effect identifier 216 may identify that image effect. Image effect identifier 216 can identify image effects for any combination of determining and/or generating ranking scores for the image effects, presenting images based on the image effects, and/or generating preview images based on the image effects.

Evaluation criteria identifier 218 is configured to identify one or more sets of evaluation criteria of sets of evaluation criteria 238. For example, evaluation criteria identifier 218 can in some cases identify a set of evaluation criteria for each one of image effects 232 identified by image effect identifier 216.

A set of evaluation criteria for an image effect can comprise a formula that ranking score determiner 226 utilizes to calculate a ranking score for the image effect for an image. A set of evaluation criteria can comprise a set of parameters which can include variables, conditionals, logic, and the like, utilized to determine the ranking score. In some cases, a ranking score could be determined in binary terms (e.g., an image is either suitable or unsuitable for an image effect based on some condition(s)). In others, a ranking score is determined as a number in a continuous scale, or range. The parameters of a set of evaluation criteria can be provided using any suitable approach. For example, one or more parameters may be defined by a system administrator. As another example, one or more parameters may be machined learned using one or more neural networks, or other machine learning techniques. In some cases, the parameters may correspond to user feedback on images presented to users in association with image effects. As an example, the images may be presented and selected by a user based on their ranking scores as described in further detail below. Selected images may be used as positive samples in training a machine learning model corresponding to the evaluation criteria, and unselected images may be used as negative samples in the training.

In various implementations, ranking score determiner 226 utilizes image features of an input image to evaluate the various parameters of a set of evaluation criteria for that image. For example, the set of evaluation criteria could define the image features to use as variables in evaluating the parameters. An image feature can correspond to a quality, property, or characteristic of the visual data of the input image (or images and/or video). To this effect, image analyzer 220 is configured to determine and/or generate image features of images, which are used by ranking score determiner 226 to apply evaluation criteria to the images.

Image analyzer 220 can analyze visual data of images to produce image features used in evaluation criteria at any suitable time. For example, an image feature could be determined for images prior to receiving a user selection of an image effect and/or image. As another example, one or more image features could be determined based on the user selection. Further, some image features may be utilized in different sets of evaluation criteria. In these cases, a single determination of the image feature could be used for multiple image effects and/or set of evaluation criteria. In addition or instead, once determined, an image feature could be saved in storage 230 by image analyzer 220 for subsequent determinations of ranking scores by ranking score determiner 226 for images and/or videos corresponding to an input image. For example, if an image is part of a video, a ranking score for the image could be determined using an image feature, and subsequently the image feature could be used in determining a ranking score for the video. The image feature could be stored in any suitable manner, such as in metadata of the image.

The analysis performed by image analyzer 220 to evaluate evaluation criteria generally involves processing the visual data. This can include analyzing pixels and/or vector graphics of the image, which correspond to the image features of the image. For example, image analyzer 220 could analyze an input image to produce an image histogram or color histogram, which comprises image features. Examples of image features that can be determined by image analyzer 220 and used in evaluation criteria includes distances between pixels and/or points, colors distribution values, background uniformity values, background noise values, whether the image includes a human or animal (e.g., a category of an object in the image), object component locations and/or identities thereof (e.g., whether the object includes eyes, locations of the eyes), and object orientation (e.g., whether the object is facing away from the camera plane, object profile, and the like).

Figure 4A:
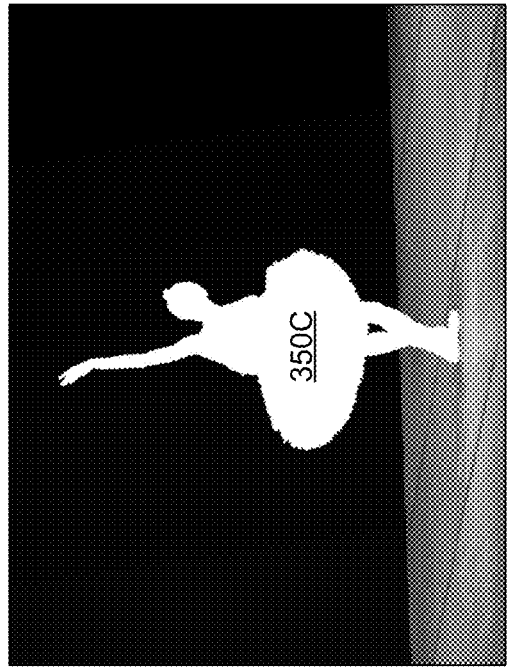
FIG. 4A is used to illustrate an example of analysis of an image to determine image features of the image, in accordance with embodiments of the present disclosure.
Figure 4A:
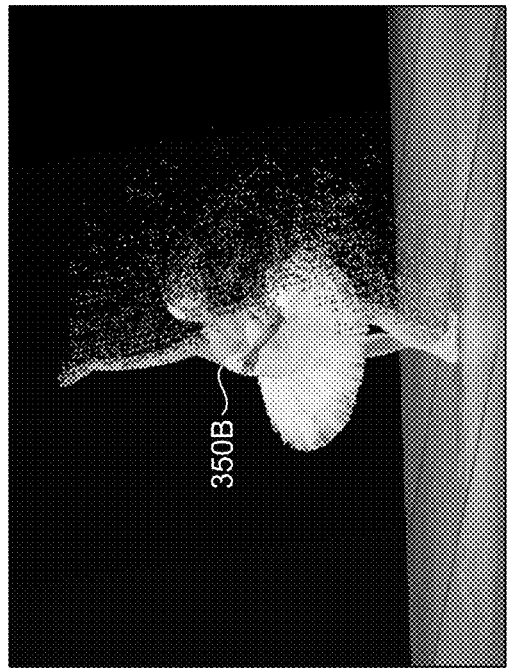
Figure 4A:
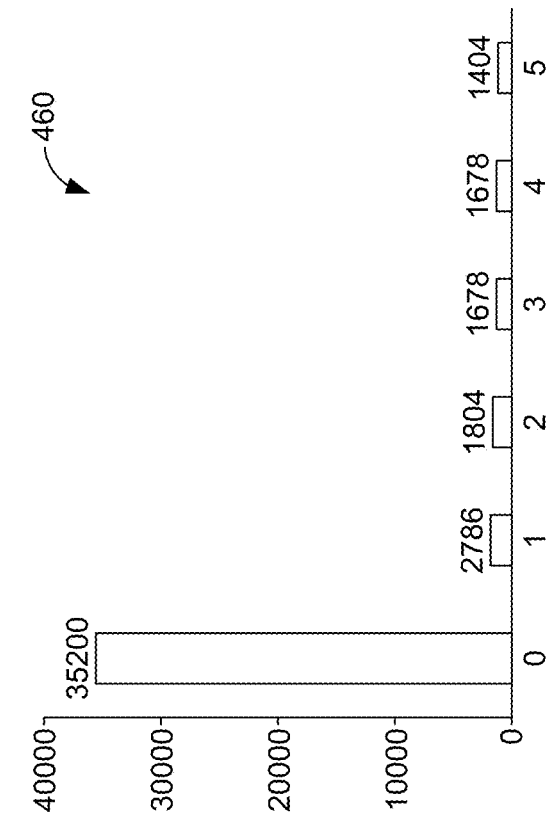
Figure 4A:
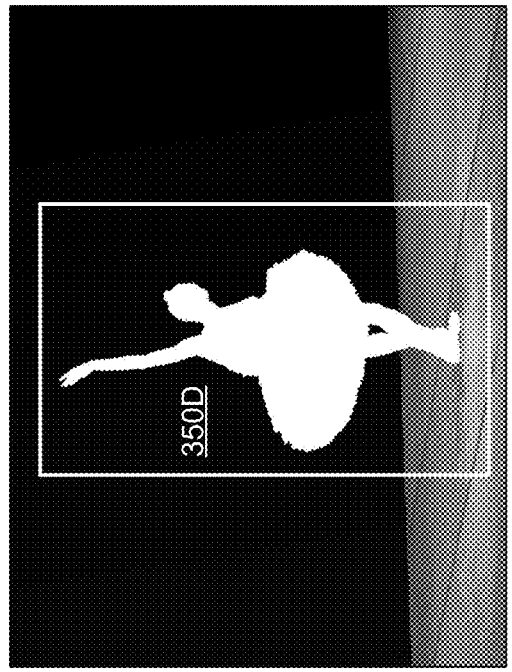

In some implementations, at least one image feature of an input image used in evaluation criteria can be determined by image analyzer 220 based on identifying an object in the input image. For example, image analyzer 220 may use any suitable algorithm for identifying one or more portions of the visual data of the image that comprise, or form, the object in the visual data. One such example of an object is shown in FIG. 4A, which is used to illustrate an example of analysis of an image to determine image features of the image, in accordance with embodiments of the present disclosure. FIG. 4A shows the original version of image 350, which includes object 350B and background 350A, each of which may be identified and/or determined by image analyzer 220. As one specific example, image analyzer 220 could use saliency based auto-cutout, which produces mask 350C where the pixels of the mask correspond to the pixels of a main subject object of the image (e.g., object 350B). However, it should be appreciated that there are many ways to identify an object in visual data. Further, multiple objects could be identified in an image.

Having identified at least one object in an input image, image analyzer 220 can determine an image feature of the image used in evaluation criteria based on the identified object. For example, the image feature could be a feature of one or more identified objects (an object feature), a feature of the a background identified using the one or more identified objects (a background feature), and/or a feature corresponding to a relationship between an identified object and the background (an object-background feature). These image features could correspond to a shape of the object, such as a length, width, size, and/or orientation, which image analyzer 220 can determine from analyzing the image. In addition or instead, image features can correspond to color information of the object, such as subject lighting. As examples, object-background features can correspond to subject-background separability, subject lighting, and subject-background contrast. In some cases, an image feature in evaluation criteria used to determine a ranking score could be based on a number of objects identified in the image, and/or determining whether the image contains a main or predominant object (e.g., based on the size of the object relative to the image, location of the object, and/or relative size to one or more other objects) in the image.

An example of ranking score determiner 226 determining a ranking score for an image for a particular image effect using image analyzer 220 will be described with respect to FIG. 4A. Image analyzer 220 can identify object 350B in image 350, using saliency based auto-cutout, which is used by image analyzer 220 to identify and define background 350A by applying mask 350C to image 350.

Optionally, image analyzer 220 may determine portion 350D of background 350A using identified object 350B for analysis of background 350A. In some cases, image analyzer 220 determines portion 350D based on a location of object 350B in image 350. For example, a border of portion 350D can be determined based on a location of object 350B. Portion 350D can comprise a surrounding area of object 350B in the image that is bounded by that border. In the present example, portion 350D comprises visual data (e.g. pixels) within portion 350D. Image analyzer 220 can determine portion 350D by computing a bounding rectangle or other shape. This could include a smallest rectangle or predefined shape that completely covers the object. In the present example, image analyzer 220 expands the determined bounding shape to capture surrounding visual data of the object. Thus, portion 350D can comprise visual data within a vicinity of object 350B (e.g., determined based on an outer border of object 350B). Image analyzer 220 may determine portion 350D using neighborhood pixel aggregation, as an example.

Image analyzer 220 may use portion 350D, for example, to determine at least one image feature of background 350A that is used in evaluation criteria based on a proximity of the visual data of background 350A to object 350B in the image. For example, for some image effects, the quality of their output can depend on characteristics of the background proximate to object 350B. Image analyzer 220 can identify this visual data in the background (e.g., as described above) to derive at least one image feature corresponding to the visual data to use in evaluation criteria for determining a ranking score. For example, the pixels of portion 350D can form a residual image fragment, and a histogram can be formed from those pixels. In FIG. 4A, an example of the histogram is shown as histogram 460, which comprises a count of the number of pixels in the residual image fragment for each color. It is noted that in some cases similar colors could be aggregated into a single count. It is further noted that the images shown in FIG. 4A need not be created by image analyzer 220 and/or displayed on a device, but are primarily shown to illustrate analysis performed by image analyzer 220.

In the example of a dispersion effect, and other effects which alter the background adjacent to objects, it has been found that the image effects produce higher quality output when the images have high foreground-background separation, such as when the visual data (e.g., pixels) proximate to an object(s) is substantially uniform. Thus, in various embodiment, the evaluation criteria may be based on foreground-background separation. Image analyzer 220 can determine the background uniformity proximate to object 350B by analyzing histogram 460. This can be based on relative color frequencies in portion 350D (e.g., based on determining there is a predominant color). For example, image analyzer 220 may determine the Shannon entropy of the background (e.g., the residual image fragment) to derive an image feature corresponding to background uniformity. The entropy of the background (or one or more portions thereof) can be a measure of chaos in its color diversity. The higher the entropy, the flatter the histogram, meaning there is typically a broader range of colors. This can make it difficult to accurately fill gaps in the histogram between colors. The lower the entropy, the more spiked the histogram is, meaning there is typically a narrower range of colors. This can lead to higher accuracy in filling gaps in the histogram between colors.

Figure 4B:
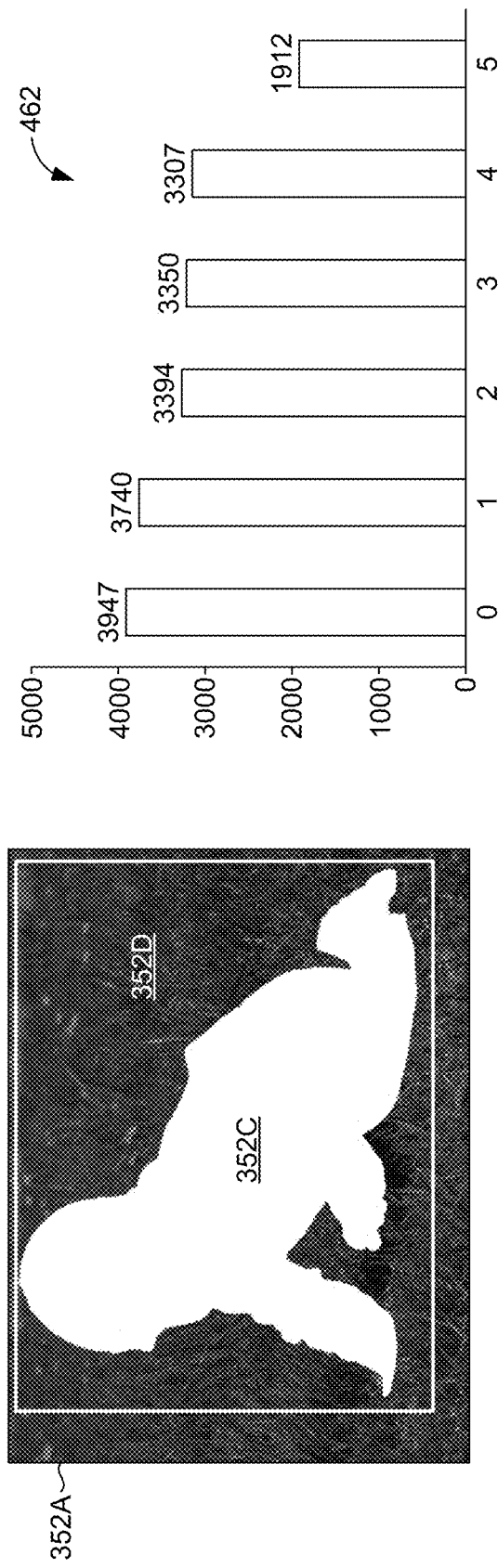
FIG. 4B is used to illustrate an example of analysis of another image to determine image features of the image, in accordance with embodiments of the present disclosure.

Image 350 is an example of an image that image analyzer 220 can derive a high ranking score for with respect to a dispersion effect (e.g., based on the Shannon entropy). Image 352 is an example of an image that image analyzer 220 can derive a lower ranking score for with respect to the dispersion effect. For example, image analyzer 220 can determined histogram 462 of FIG. 4B from image 352 using mask 352C, and portion 352D of background 352A. As can be seem in histogram 462, portion 352D has higher entropy than portion 350D of image 350, which can cause a lower ranking score for image 352.

Evaluation criteria for other image effects may be determined in a similar manner as described with respect to FIG. 4A. However, a different set of evaluation criteria could be employed. For example, image features may be determined from analyzing the identified object, background, and/or combination thereof. Further, background uniformity may be a factor in some sets of evaluation criteria, where as other factors may vary amongst the set of evaluation criteria.

Examples of evaluation criteria for various images effects are described below. Evaluation criteria for each of these image effects may be similar to what has been described above with respect to the dispersion effect, but may be modified to customize the evaluation criteria to the image effect, or may be based on completely different evaluation criteria. As an example, each of the image effects may have evaluation criteria that favors high foreground-background separation.

An example of another image effect is an out of bounds effect where the image is altered such that the object appears to be emerging from the background (e.g., breaks the plane of the background at one or more outer edges thereof). An example of an image feature that may be factored into evaluation criteria used to determine a ranking score for the out of bound effect or another image effect is a motion of the object (e.g., image analyzer 220 can determine whether the object is in motion and/or a degree of motion or confidence of motion). Generally, the evaluation criteria may favor images in which an object is in motion (e.g., a person running, waving, etc.) over those in which the object is static. This could be determined, for example, using image classification techniques that classify actions of objects in images. For example, each action may have a predetermined degree of motion, or a binary status of being either in motion or static. The degree of motion, binary status, and/or confidence scores used in those determinations could be used in evaluation criteria. A further example is a direction of the object (e.g., image analyzer 220 can determine which direction the object is facing). Similar image classification techniques could be performed as used for actions, such as to categorize objects as facing left, right, up, or down (or angles in-between). The evaluation criteria could favor, for example, left or right facing objects over those facing up or down.

Another example of an image effect is fire effect where portions of the object and/or background are altered to create an appearance that the object is on fire or surrounded by fire. Evaluation criteria of the fire effect may favor, for example, static objects over those images containing objects in motion, which could be determined using approaches described above, as an example.

Another example of an image effect is a neon effect where the background is modified proximate the object and/or overlapping the object to create an appearance of a three-dimensional light surrounding the object (e.g., in a third-dimension). Evaluation criteria of the neon effect may favor, for example, objects and/or backgrounds (e.g., in the vicinity of objects, determined as described above) that are less color saturated. Color saturation can be determined by analyzing one or more color histograms of objects and/or backgrounds (e.g., in the vicinity of the objects, determined as described above) and used in evaluation criteria. In addition or instead, evaluation criteria of the neon effect may favor darker colored objects and/or backgrounds. Thus, color brightness could be determined by analyzing one or more color histograms of objects and/or backgrounds (e.g., in the vicinity of the objects, determined as described above).

A further example of an image effect is a double exposure effect which includes two input images. In this image effect, an object in one of the images is blended with the other image to produce the output image. For example, in one image, the background may be removed or not be altered and the object may be blended to contain visual data from the other image. Furthermore, the other image could be used as a reference image when evaluating the evaluation criteria against each image, such that the suitability of the image effect for the images factors in that reference image for each image.

In some cases, for image effects that use multiple images, such as double exposure, the set of evaluation criteria may include different subsets of evaluation criteria for different image types in the image effect. For example, image analyzer 220 may evaluate one subset to determine suitability of each image to use as a source of an object in the image effect, and another subset to determine suitability of each image to use as a source of a background in the image effect (e.g., that is blended with the object in the double exposure effect). In this case, the ranking score generated from the set of evaluation criteria for the image effect for multiple images may be a combination (e.g., average) of subscores from subsets sets of evaluation criteria, where each subscore could correspond to a different image. As an example, given two images, the ranking score could be the average (or other combination) of one subscore ranking one image on its suitability to be a source of an object, and another subscore ranking the other image on its suitability to be a source of a background to be applied to the object. In some implementation, image analyzer 220 operates in conjunction with image effect applier 224. For example, image effect applier 224 can utilize one or more objects, backgrounds, and/or portions thereof that are identified by image analyzer 220 in applying at least one image effect to an image. For example, for image effect 340, image effect applier 224 may apply the image effect to background 350A which is identified by image analyzer 220 in determining image features for ranking scores. As an example, image effect applier 224 could modify background 350A based on visual data (e.g., pixels) from object 350B, identified by image analyzer 220. Furthermore, image effect applier 224 can in some implementations utilize components of an image that are identified by image analyzer 220 for multiple different image effects. In this way the overall processing to apply image effects to images can be reduced.

Image effect applier 224 can apply an image effect to images using various steps and parameters of those steps. In some cases, at least one parameter is optionally determined from image features, such as those described above (e.g., some could be used for both ranking score determinations and the image effect parameter determinations). An example of a parameter for image effect 340 is the direction of the dispersion, the length of the dispersion, particle size of the dispersion, number of particles of the dispersion, and more. In some cases, the parameters utilized to generate a preview image could be default parameters that can be modified by a user and used to generate a version of the image corresponding to the image effect using the modified parameters.

As mentioned above, presentation manager 222 is configured to cause presentation of information on one or more user devices based on the ranking scores. This can be accomplished by presentation manager 222 transmitting data that causes the presentation. For example, where presentation manager 222 is located on a user device, such as user device 102A (e.g., as part of application 110), presentation manager 222 could communicate data with a service on the device to cause the presentation. Where presentation manager 222 is at least partially located on a server, such as server 108, the data could be transmitted over network 104. Examples of the data can include, for example, any combination of at least one of the preview images, ranking scores, the original images, an order in which to present the images, an API call to present the preview image, and an operating system call to present the preview image.

The transmission of the data could result in the display of preview images shown in FIG. 3, as an example. However, as indicated above, versions of the original images could be displayed rather than preview images of image effects in some implementations. Furthermore, rather than displaying multiple images for a particular image effect, in some cases, the highest ranking image effect for a particular image and/or data object could be indicated by the presentation. As another example, the same image could be ranked against multiple image effects, and the ranking order of those effects for that image could be indicated by the presentation (e.g., the most suitable image effect for that image could be ordered first, and the least suitable last, as indicated by the ranking scores). It should therefore be appreciated that ranking scores could be employed to indicate to users relative suitability of different image effects for a particular image and/or relative suitability of different images for a particular image effect (or combinations thereof).

In some implementations, at least one image presented to the user based on the ranking scores is user selectable in the GUI. For example, in GUI 300, the user could select at least image 350 by clicking on that image or otherwise interacting with gallery view 360. Based on the user selection, user input manager 212 may perform some predetermined action. As an example, selected images could be loaded into an application (e.g., application 110 or another application). The application may include GUI 300, or may be a separate application. In various implementations, the application displays the preview image for the image that was displayed in GUI 300, or may display a higher resolution version of the preview image. For example, the higher resolution version could be generated based on the user selection of the image by applying the image effect to the original version of the image. This can save processing power has higher resolution versions may be generated as needed. In some cases, this is an automatic process where the user selects the image, the preview image is automatically displayed in the application. In addition or instead, the user could be presented with at least one menu or other interface allowing the user to modify parameters of the effect (e.g., after the preview image is displayed). It is noted that after applying the image effect, the original identified object, background, and the like, could be retained to reduce redundant processing when updated the image effect for an image.

Loading a preview image is one example of an action that could be taken. Another example is initiating saving the preview image to persistent storage and/or persistently associating the image with the user account. As another example, an action could include causing the preview image to be sent to another user. For example, selecting an image could cause an interface to be presented that allows the user to specify a means for transmission (e.g., SMS, email, text message, etc.) and/or an intended recipient for the preview image.

Figure 5:
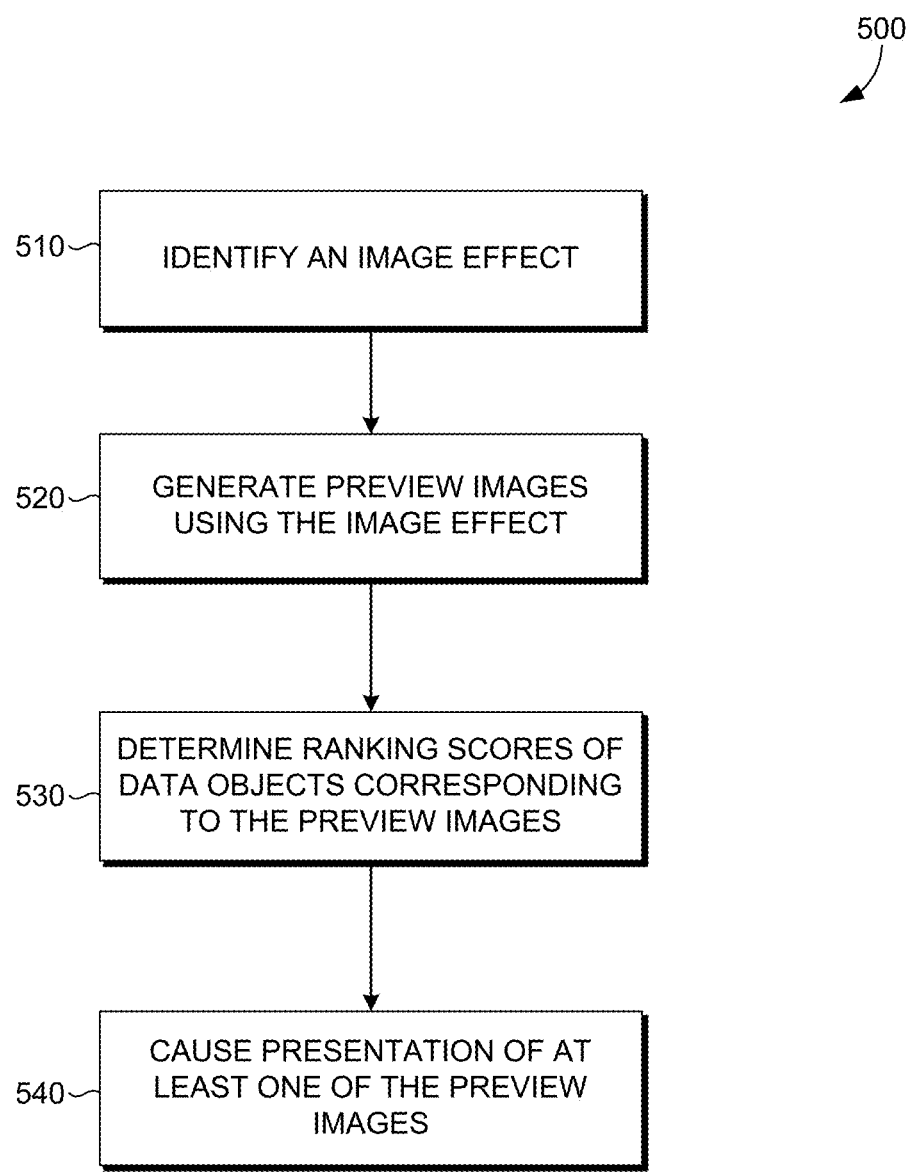
FIG. 5 is a flow diagram showing a method for ranking images against image effects, in accordance with embodiments of the present disclosure.

Referring now to FIG. 5, a flow diagram is provided showing an embodiment of a method 500 for ranking images based on images effects. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, method 500 includes identifying an image effect. For example, image effect identifier 216 can identify an image effect from image effects 232. Each image effect can include a corresponding set of instructions defining steps of modifying visual data of an input image to produce an output image.

At block 520, method 500 includes generating preview images using the image effect. For example, image effect applier 224 can generate preview images. This can include for each of data objects 234 applying the set of instructions of the image effect to a respective image (e.g., digital image 236) corresponding to the data object to generate a preview image of the data object.

At block 530, method 500 includes determining ranking scores of data objects associated with the preview images. For example, ranking score determiner 226 can determine ranking scores 240. This can include for each data object 234, analyzing visual data of the respective image using a set of evaluation criteria 238 associated with the image effect to determine a ranking score of the image effect for the data object.

At block 540, method 500 includes causing presentation of at least one of the preview images. For example, presentation manager 222 can transmit data causing presentation of the preview images (e.g., in gallery view 360) on a user device (e.g., user device 102A). The data can include, for example, any combination of at least one of the preview images, ranking scores, the original images, an order in which to present the images, an API call to present the preview image, and an operating system call to present the preview image.

Figure 6:
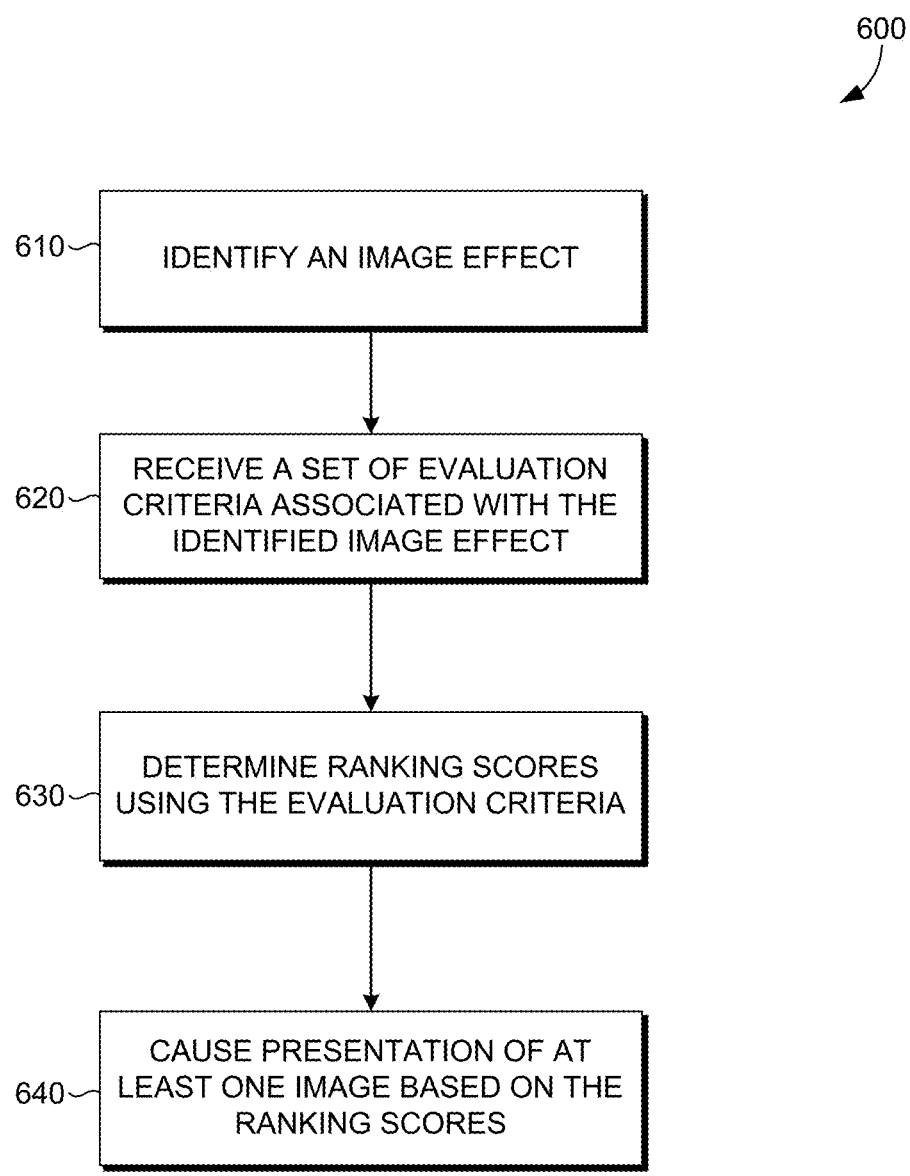
FIG. 6 is a flow diagram showing another method for ranking images against image effects, in accordance with embodiments of the present disclosure.

With reference to FIG. 6, a flow diagram is provided showing an embodiment of a method 600 for ranking images based on image effects.

At block 610, method 600 includes identifying an image effect. For example, image effect identifier 216 can identify an image effect from image effects 232. Each image effect can include a corresponding set of instructions defining steps of modifying visual data of an input image to produce an output image.

At block 620, method 600 includes receiving a set of evaluation criteria associated with the identified image effect. For example, evaluation criteria identifier 218 can receive from storage 230, for at least the image effect, a set of evaluation criteria 238 associated with the image effect. Each image effect 232 can be associated with a different set of evaluation criteria 238.

At block 630, method 600 includes determining ranking scores using the evaluation criteria. For example, ranking score determiner 226 can determine ranking scores for images in one or more of data objects 234. This can include for each image, analyzing visual data of the image using the received set of evaluation criteria to determine a ranking score of the image effect for the image.

At block 640, method 600 includes causing presentation of at least one image on based on the ranking scores. For example, presentation manager 222 can transmit data causing presentation of the preview images (e.g., in gallery view 360) and/or the original images on a user device (e.g., user device 102A). The data can include, for example, any combination of at least one of the preview images, ranking scores, the original images, an order in which to present the images, an API call to present the preview image, and an operating system call to present the preview image.

Figure 7:
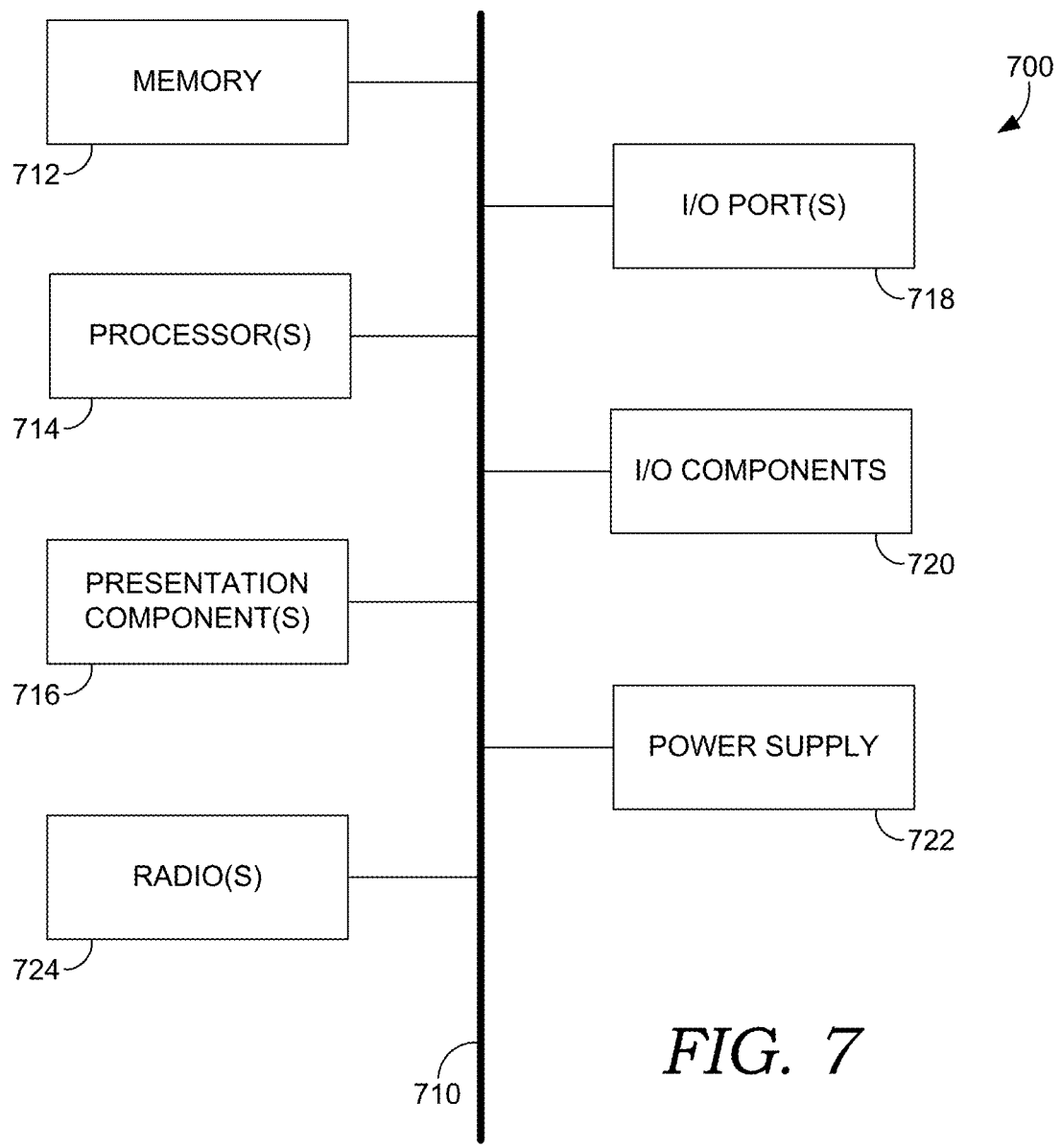
FIG. 7 is a block diagram of an exemplary computing environment suitable for use in implementing embodiments of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for ranking images against a plurality of image effects, the method comprising:
   identifying an image effect from the plurality of image effects, each image effect comprising a set of instructions defining steps of modifying visual data of an input image to produce an output image;
   generating the output image for each of a plurality of input images, the generating comprising for each data object of a plurality of data objects applying the set of instructions of the image effect to each of the plurality of input images corresponding to the data object to generate the output image of the data object;
   ranking each output image of the output images, the ranking comprising, analyzing visual data of each output image using a set of evaluation criteria unique to the image effect, the set of evaluation criteria defines a degree to which each output image, of the plurality of output images, is a higher quality output image for the image effect, wherein the ranking further comprises assigning a ranking score to each output image based on the evaluation criteria, wherein the set of evaluation criteria uses a characteristic of an object identified and a characteristic of a background of the object identified; and
   transmitting data causing presentation of at least one of the output images on a user device based on the ranking score of each output image of the output images.

2. The method of claim 1, wherein the modifying for the image effect comprises:
   identifying an object in the input image, the object comprising an area of the image; and
   transforming the visual data of the input image based on the identified object to produce the output image.

3. The method of claim 1, wherein the determining comprises for each data object:
   identifying an object in the respective image, the object comprising an area of the respective image;
   defining a surrounding area of the object based on a location of the object in the respective image; and
   determining a characteristic of the surrounding area, wherein the set of evaluation criteria uses the characteristic.

4. The method of claim 1, wherein the modifying for the image effect comprises identifying an object in the input image, the object comprising an area of the image, and wherein the set of evaluation criteria uses the identified object.

5. The method of claim 1, wherein the presenting comprises causing display of the output images, each output image displayed in an order based on the ranking score of the corresponding data object.

6. The method of claim 1, wherein the identifying of the image effect is based on a user selection of the image effect from the plurality of image effects in a user interface.

7. The method of claim 1, further comprising:
   receiving a user selection of a particular output image of the at least one of the presented output images;
   based on the received user selection, presenting an editing interface comprising at least one graphical control element selectable to modify one or more parameters of the image effect; and
   applying the image effect with the modified one or more parameters based on user interaction with the at least one graphical control element.

8. The method of claim 1, further comprising determining an additional set of ranking scores, the determining comprising for each data object, analyzing visual data of the respective image using a set of evaluation criteria associated with a different image effect of the plurality of image effects to determine a ranking score of the different image effect for the data object, wherein the presenting is further based on the determined additional set of ranking scores.

9. The method of claim 1, wherein each data object of the data objects has an image file format.

10. At least one non-transitory computer-readable media having executable instructions embodied thereon, which, when executed by at least one processor, causes the at least one processor to perform a method for ranking based on a plurality of image effects, the method comprising:
    identifying an image effect from the plurality of image effects, each image effect comprising a set of instructions defining steps of modifying visual data of an input image to produce an output image;
    for at least the image effect, receiving a set of evaluation criteria associated with the image effect from a data store, each image effect associated with a different set of evaluation criteria wherein each set of evaluation criteria quantifies a level of suitability of the input image for the image effect;
    determine at least one image feature for each of a plurality of images, the determining comprising for each image, analyzing visual data for the image;
    ranking each output image of the output images, the ranking comprising, analyzing visual data of each output image using a set of evaluation criteria unique to the image effect, the set of evaluation criteria defines a degree to which each output image, of the plurality of output images, is a higher quality output image for the image effect, wherein the ranking further comprises assigning a ranking score to each output image based on the evaluation criteria, wherein the set of evaluation criteria uses a characteristic of an object identified and a characteristic of a background of the object identified; and
    transmitting data causing presentation of at least one of the output images on a user device based on the ranking score of each output image of the output images.

11. The at least one non-transitory computer-readable media of claim 10, wherein the determining comprises for each image:
    identifying an object in the respective image, the object comprising an area of the respective image;
    defining a surrounding area of the object based on a location of the object in the respective image; and determining a characteristic of the surrounding area, wherein the set of evaluation criteria uses the characteristic.

12. The at least one non-transitory computer-readable media of claim 10, wherein the evaluation criteria uses object-background separability of an object and a background of the image, and the analyzing comprises determining the object-background separability.

13. The at least one non-transitory computer-readable media of claim 10, wherein the evaluation criteria uses background uniformity of a background of an object in the image, and the analyzing comprises determining the background uniformity.

14. The at least one non-transitory computer-readable media of claim 10, wherein the analyzing is of a histogram of the visual data.

15. A computer-implemented system for ranking images against a plurality of image effects, the system comprising:
- an evaluation criteria identifier means for identifying a set of evaluation criteria associated with an image effect;
- an image effect identifier means for identifying the image effect from the plurality of image effects, each image effect comprising a set of instructions defining steps of modifying visual data of an input image to produce an output image;
- an output image generator means for generating the output image for each of a plurality of input images, the generating comprising for each data object of a plurality of data objects applying the set of instructions of the image effect to each of the plurality of input images corresponding to the data object to generate the output image of the data object;
- a ranking determiner means for determining ranking, for each image of a plurality of images for the image effect, each ranking determined based on analyzing visual data of each of the images of the plurality of images using the identified set of evaluation criteria unique to the image effect, the set of evaluation criteria defines a degree to which each output image, of the plurality of output images, is a higher quality output image for the image effect, wherein the ranking determiner assigns a ranking score to each output image based on the evaluation criteria, wherein the set of evaluation criteria uses a characteristic of an object identified and a characteristic of a background of the object identified; and
- a presentation means for transmitting data causing presentation of at least one image of the plurality of images on a user device based on the ranking score of each output image of the plurality of images.

16. A computer-implemented system of claim 15, further comprising an image analyzer means for performing the analyzing of the visual data of the image.

17. A computer-implemented system of claim 15, further comprising an image effect applier means for applying the image effect to the plurality of images.

* * * * *